United States Patent [19]
Yafuso et al.

[11] Patent Number: 6,108,536
[45] Date of Patent: Aug. 22, 2000

[54] SYSTEM AND METHOD FOR DISPLAYING PERFORMANCE CHARACTERISTICS OF A CELL SITE MODEM

[75] Inventors: Byron Yafuso, San Diego; Eric Katzfey, Encinitas; Friedrich G. Knauss, San Diego; Bruce R. Meagher, San Diego; Beth Kuehn Monge, San Diego, all of Calif.

[73] Assignee: Qualcomm Inc., San Diego, Calif.

[21] Appl. No.: 08/956,873

[22] Filed: Oct. 23, 1997

[51] Int. Cl.[7] ................................................ H04B 17/00
[52] U.S. Cl. ........................ 455/424; 455/67.4; 455/67.7
[58] Field of Search .................................. 455/423, 424, 455/425, 69, 67.1, 67.4, 67.7, 226.1, 226.2, 226.3, 226.4; 375/216, 224, 225

[56] References Cited

U.S. PATENT DOCUMENTS

| | | | |
|---|---|---|---|
| 5,451,839 | 9/1995 | Rappaport et al. | 375/224 |
| 5,471,650 | 11/1995 | Vexler et al. | 455/69 |
| 5,627,834 | 5/1997 | Han et al. | 370/241 |
| 5,640,684 | 6/1997 | Konosu et al. | 455/67.7 |

FOREIGN PATENT DOCUMENTS 9634501  10/1996  WIPO .

OTHER PUBLICATIONS

Kang, et al. "CDMA Mobile Communication System Performance Analysis Tools for Network Parameter Planning" IEEE 46th Vehicular Technology Conference 2(conf 46): 894–898 (1996).

Kim, et al. Development of the CDMA System Performance Analysis Tool (CAT) IEEE 46th Vehicular Technology Conference 2(conf 46): 1400–1403 (1996).

*Primary Examiner*—Thanh Cong Le
*Attorney, Agent, or Firm*—Philip Wadsworth; Sean English; Maryanne Deangelo

[57] ABSTRACT

A system for displaying performance characteristics of a circuit in a telecommunications network. The system is adapted for use with a CDMA telecommunications network and includes a Markov call testing system for performance testing the telecommunications circuit. A computer stores the results of the performance test. Software running on the computer determines a subset of the results sufficient to reflect the performance of the telecommunications circuit. A monitor on the computer displays information corresponding to the subset. In the illustrative embodiment, the system further includes a method for determining if one or more receive antennas in the telecommunications network are balanced. The telecommunications circuit corresponds to a cell site modem chip in a base station. The subset includes a number of finger signal peaks. The number is determined by calculations performed on a scan set to determine a floor above which signal peaks are chosen for inclusion in the subset. In the specific embodiment, the subset includes the eight highest signal peaks of a scan set. The scan set corresponds to a set of signal peaks as is provided by a temporal analyzer. In the illustrative embodiment, the display shows finger signal peak data resulting from Markov call testing of a cell site modem chip having one or more fingers. A first field in the display depicts a subset of signal peaks that includes n of the highest signal peaks. A second field illustrates an operational state for each of the fingers.

8 Claims, 2 Drawing Sheets

SYSTEM AND METHOD FOR DISPLAYING PERFORMANCE CHARACTERISTICS OF A CELL SITE MODEM

BACKGROUND OF THE INVENTION

I. Field of Invention

This invention relates to telecommunications systems. Specifically, the present invention relates to systems for displaying performance characteristics of a code division multiple access (CDMA) telecommunications circuit.

II. Description of the Related Art

Wireless telecommunications systems are used in a variety of demanding applications ranging from search and rescue operations to business communications. Such applications require high performance cellular connections with maximum signal strength and reliability.

A CDMA network is separated into several geographical regions, i.e., cells, each region managed by a base station. The base station routes calls carried over cellular telephones, i.e., mobile stations, to and from a telecommunications network via a mobile switching center (MSC). The MSC routes calls among various base stations in the network, and to and from a public switched telephone network (PSTN), a network of conventional telephone lines.

Each base station has several cell site modems (CSM) which transmit and receive signals to and from mobile stations and other network entities. The performance of the CSMs must be accurately monitored so that transmission and reception problems are readily detected and corrected. CSM performance affects the performance of the entire CDMA network.

A CSM card may have a plurality of CSM chips, each having one or more CSM decoders, i.e., fingers used to decode incoming calls. The CSM chips are typically tested via the use of a Markov call. A Markov call is a cellular call that is used to measure transmission errors in a cellular communication system. A Markov call involves the transmission of a known mathematical pattern that simulates an actual call. By comparing the received signal with the expected signal, an accurate measurement of transmission errors may be made at the receiving end. These errors may then be traced back to a particular CSM chip.

To accurately monitor and tune the performance of a base station, the performance characteristics measured at a CSM chip may be measured. Performance characteristics of particular importance include CSM finger and peak data for a given Markov call. The finger data includes the signal strength of the incoming Markov call at each of the CSM fingers in a given test set of CSM chips. The peak data includes signal peaks received by the CSM fingers.

CSM finger and peak data may be used to verify proper CDMA antenna installation. For example, if a receive antenna at a base station is tilted incorrectly, the CSM chips associated with a call through that antenna will have different finger and peak data than that of a correctly installed antenna. If antennas at a base station are properly installed and tilted, they are said to be balanced.

Typically, accessing finger and peak data requires the use of a temporal analyzer. A temporal analyzer is typically difficult to read and uses an excessive amount of transmission bandwidth. Hence, a single collection of finger and peak data from a given base station often takes several hours using a conventional temporal analyzer.

Hence, a need exists in the art for a user friendly system for displaying CSM finger and peak data resulting from Markov call testing. There is a further need for an efficient system and method for determining base station antenna balancing.

SUMMARY OF THE INVENTION

The need in the art is addressed by the system for displaying performance characteristics of a circuit in a telecommunications network of the present invention. In the illustrative embodiment, the inventive system is adapted for use with a CDMA telecommunications network and includes a system for performing Markov call testing to performance test the telecommunications circuit. A computer stores the results of the performance test. Software running on the computer determines a subset of the results sufficient to reflect the performance of the telecommunications circuit. A monitor on the computer displays information corresponding to the subset.

In the illustrative embodiment, the system further includes a method for determining if two receive antennas of a given sector in the telecommunications network are balanced. The telecommunications circuit corresponds to a cell site modem chip in a base station. The subset further includes a number of finger signal peaks. The number is determined by calculations performed on the performance test results to determine a floor above which signal peaks are chosen for inclusion in the subset. In the specific embodiment, the subset includes the eight highest signal peaks of a scan set as would be provided by a temporal analyzer.

In the illustrative embodiment, the display shows finger signal peak data resulting from Markov call testing of a cell site modem chip having one or more fingers. A first field in the display depicts a subset of signal peaks that includes n of the highest signal peaks. A second field illustrates an operational state for each of the fingers.

The novel design of the present invention is facilitated by a unique method arising out of the use of the display of the present invention. The method determines if a base station's receive antennas are balanced and includes the following steps: first, obtaining a first antenna and a second antenna whose antennas are to be compared for antenna balancing purposes; second, establishing an energy threshold by which the average signal peak values in a signal peak subset corresponding to the first and second antennas may differ before they are considered to be out of balance for a Markov call received from a predetermined location within a coverage area of the base station; third, performing a Markov call test from the predetermined location using the first and second antennas and a cell site modem chip; fourth, subtracting the average peak energies of the signal peak subset for the first antenna from the average peak energies for the second antenna to determine an average signal peak difference; and fifth, comparing the average signal peak difference with the energy threshold to determine if the antennas are in balance.

DETAILED DESCRIPTION OF THE PREFERRED EMBODIMENTS

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
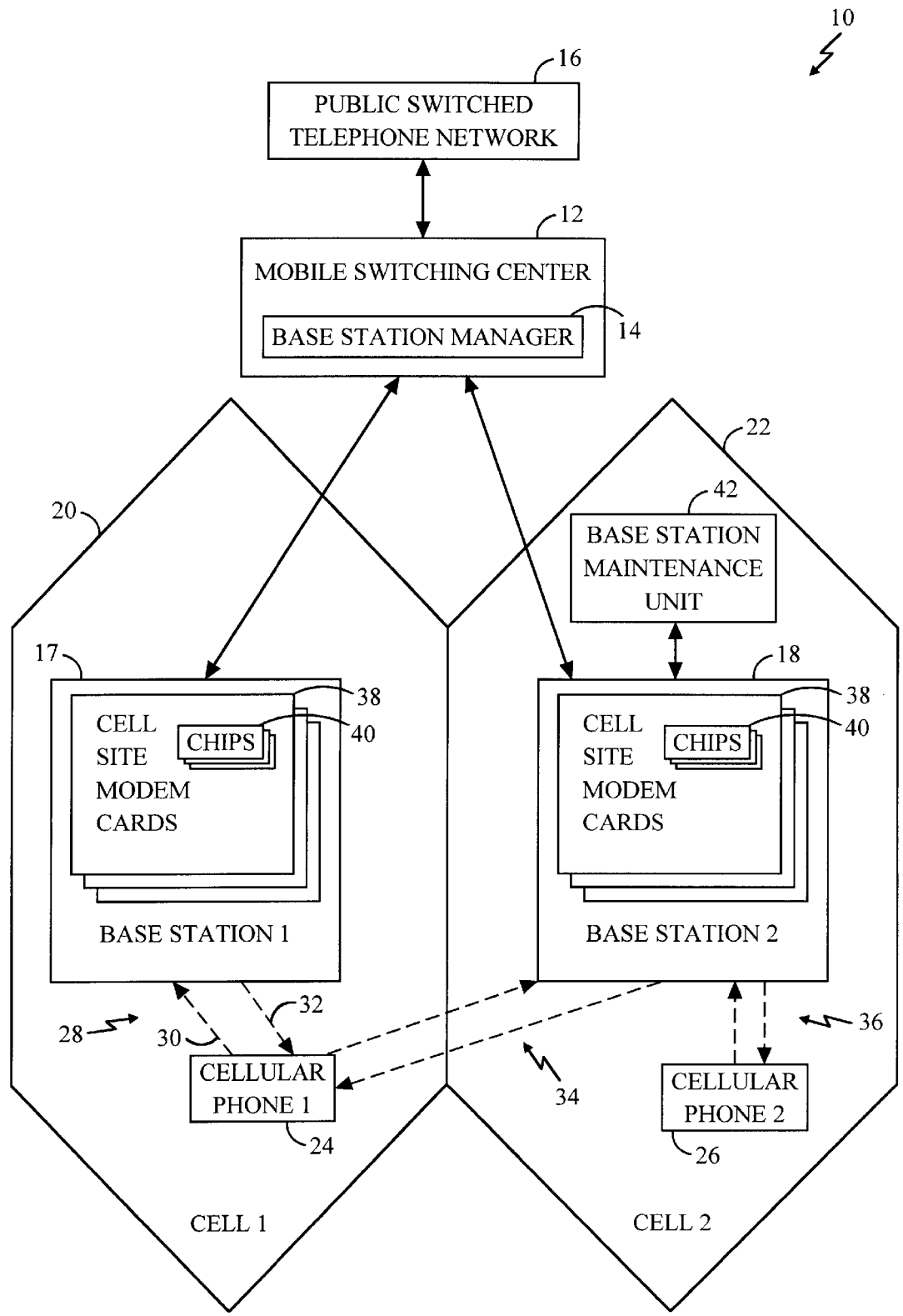
FIG. 1 is a block diagram of an exemplary CDMA telecommunications system.

FIG. 1 is a block diagram of an exemplary CDMA cellular telephone system 10. The system 10 includes an MSC 12 that is managed by a base station manager (BSM) 14. A public switched telephone network (PSTN) 16 routes calls from telephone lines and other networks (not shown) to and from the MSC 12. The MSC 12 routes calls from the PSTN 16 to and from a source base station 17 and a target base station 18 associated with a first cell 20 and a second cell 22 respectively. In addition, the MSC 12 routes calls among the base stations 17, 18.

The source base station 17 directs calls to a first mobile station 24 within the first cell 20 via a first communications link 28. The communications link 28 is a two-way radio link having a forward link 32 and a reverse link 30. Typically when the base station 17 has established voice communications with the mobile station 24, the link 28 is characterized as a traffic channel.

When the mobile station 24 moves from the first cell 20 to the second cell 22, the mobile station 24 is handed off to the target base station 18. In a soft handoff, the mobile station 24 establishes a second communications link 34 with the target base station 18 in addition to the first communications link 28 with the source base station 17. When mobile station 24 has crossed into the second cell 22, it may drop the first communications link 28.

In a hard handoff, the communications link 34 is not established. When the first mobile station 24 moves from the first cell 20 to the second cell 22, the link 28 to the source base station 17 is dropped and a new link is formed with the target base station 18.

The communications links 28, 34, and 36 are Air-Interface radio links. Data transfers on these links is currently governed by the IS-95A or IS-95B standards.

Each base station 17, 18 includes several CSM cards 38 each having several CSM chips 40. The CSM chips serve to transmit modulated signals to the mobile station and track and demodulate signals coming from the mobile station. The CSM chips 40 included in the CSM cards 38 are configured by a BMU 42 or the BSM 14 to operate on different communication channels. Some CSM chips 40 are allocated for overhead channels and other chips are configured for traffic channels (see FIG. 4). Overhead channels typically carry service negotiation, call initialization, and configuration messages. The traffic channels often carry voice communications. Overhead channels include the paging channel, the access channel, synchronization channels, and so on. Conventional Markov call testing is primarily compatible with the traffic channel.

Figure 2:
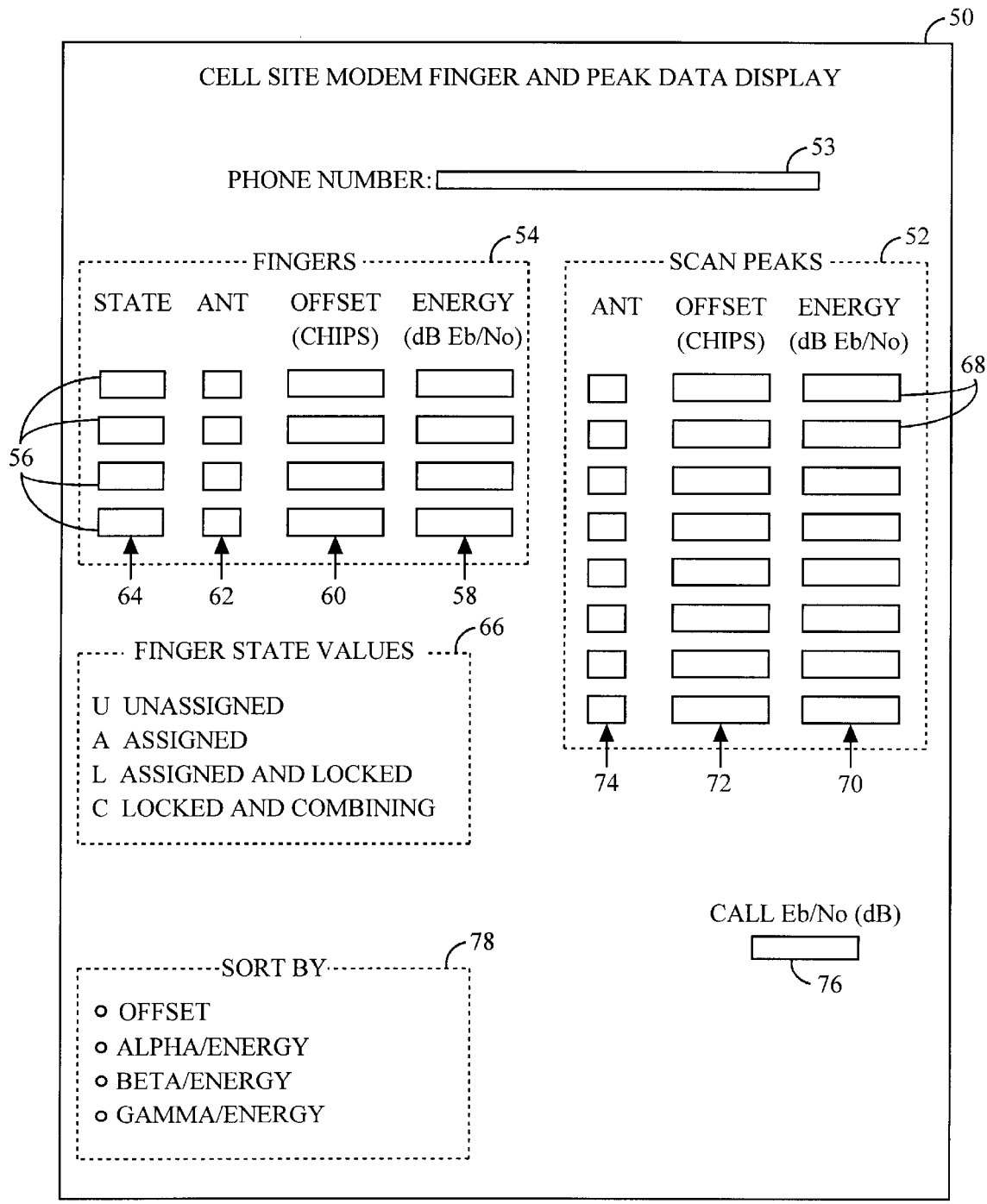
FIG. 2 is a diagram of a display to facilitate base station performance conclusions based on a subset of finger and peak data constructed in accordance with the teachings of the present invention.

FIG. 2 is a diagram of a display 50 to facilitate base station performance conclusions based a subset 52 of finger and peak data constructed in accordance with the teachings of the present invention. The inventive display 50 is adapted for use with the telecommunications network of FIG. 1, and in particular, software running on the base station maintenance unit (BMU) (see 42 of FIG. 1. The display 50 is displayed on a monitor (not shown) associated with the BMU. The software (not shown) has access to a scan set which is a set of received signal strength values corresponding to one or more decoders, i.e., fingers included in a CSM chip under test. The data in the scan set corresponds to a subset of the data available from a temporal analyzer scan.

The display 50 displays finger and peak data represented by a fingers field 54 and a scan peaks field 52 respectively. The finger data 54 and peak data 52 correspond to information retrieved by the BMU for a Markov call test in progress. The data is provided to the BMU via a given CSM chip selected during a Markov call setup procedure implemented by Markov call testing software running on the BMU. The international phone number of the mobile station involved in the Markov call is displayed in a phone number field 53. The method and apparatus for performing a Markov call is described in detail in copending U.S. patent application Ser. No. 08/347,526, entitled "METHOD AND APPARATUS FOR TESTING A DIGITAL COMMUNICATION CHANNEL", filed Nov. 30, 1994, assigned to the assignee of the present invention and incorporated by reference herein.

In the present specific embodiment, the fingers field 54 displays information for four CSM chip fingers (not shown), each finger corresponding to different rows 56. Each row 56 includes the current signal strength 58 of the incoming Markov call, a Walsh offset 60, antenna identification 62, and finger state 64. The signal strength 58 corresponds to the energy of the incoming signal and is displayed in terms of the ratio of bit energy to noise energy in units of decibels. The Walsh offset 60 specifies how the signal received by one finger is shifted in time relative to the signal received by another finger. The antenna identification 62 specifies the antenna(s) and sector(s) through which the CSM chip under test is receiving the Markov call. The finger state 64 may specify one of four possible values for each of the four CSM fingers. These values are displayed in a finger state value field 66 and include unassigned, assigned, assigned and locked, and locked and combining.

The scan peaks field 52 includes eight rows 68, each corresponding to one of the eight highest signal peaks. The bit energy to noise ratio of each of the eight signal peaks is displayed in a signal peak column 70. Each signal peak has a corresponding chip offset as displayed in an offset column 72. The antenna corresponding to each of the eight peaks is identified in an antenna identification column 74. The total signal strength of the Markov call in progress is displayed in a total signal strength box 76.

Information in the fingers field 54 and the scan peaks field 52 may be displayed in sorted order by offset, alpha sector energy, beta sector energy, or gamma sector energy as indicated in a sort field 78.

By comparing the peak values corresponding to a first antenna (not shown) specified in the antenna column 74 to the peak values corresponding to a second antenna (not shown) for a Markov call received from different locations within the coverage area of the base station containing the CSM chip under test, the balancing of the antennas becomes quickly evident. A drive around test using a Markov call test phone and a van may be employed for the purpose of obtaining signal peak data from different locations within the base station cell.

During a Markov call to a given CSM chip in a base station, information corresponding to the receive signal strength for the fingers in the CSM chip is provided to a BMU connected to the base station in which the CSM chip under test resides. This information, i.e., scan set, is provided to software on running on the BMU via software running on processors within the base station and connected to the CSM chip under test in the base station.

Existing scan sets are currently large and use excessive bandwidth. The present invention selects a most useful subset of the scan set for display. This most usable subset in the present specific embodiment corresponds to the eight highest signal peaks in the scan set. By selecting the eight highest signal peaks, receive antenna balance may be quickly and accurately determined. In the present embodiment, number eight was chosen to account for bandwidth and hardware characteristics of a Qualcomm base station.

Those skilled in the art will appreciate that a subset of larger than eight peaks or smaller than eight peaks may be chosen for display without departing from the scope of the present invention. Different hardware and bandwidth limitations of a given base station may dictate another subset size. In general, the subset size is determined by performing statistics on a typical scan set to determine a floor. Signal peaks above the floor are chosen as the subset.

A method for determining receive antenna balancing via the use of the display of the present invention includes the steps of:

1. Establishing a first antenna and a second antenna whose antennas are to be compared for antenna balancing purposes.
2. Setting an energy threshold by which the average signal peak values in the signal peak subset corresponding to said first and second antennas may differ before they are considered to be out of balance for a Markov call originated from a predetermined location in the coverage area of the base station under test.
3. Performing a Markov call test from the predetermined location using the first and second antennas, a CSM chip, and a test phone.
4. Subtracting the average energies of the signal peak subset in the CSM finger and peak display for the first antenna from the average energies or the second antenna to determine an average signal peak difference.
5. Comparing the average signal peak difference with the energy threshold. If the difference is greater than the energy threshold, the antennas are out of balance. Otherwise they are in balance.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for ascertaining and displaying performance characteristics of a circuit in a telecommunications network comprising:

first means for performance testing said circuit;

second means for storing results from said performance test;

third means for determining a subset of said results sufficient to reflect the performance of said circuit; and fourth means for displaying information corresponding to said subset, wherein said fourth means includes means for determining if one or more receive antennas in said telecommunications network are balanced.

2. The invention of claim 1 wherein said circuit includes a cell site modem in a base station in said telecommunications network.

3. The invention of claim 1 wherein said second means includes a memory in a base station maintenance unit.

4. The invention of claim 1 wherein said first means includes a system for performing Markov call testing of said circuit.

5. The invention of claim 4 wherein said system includes a processor connected to a first transceiver on one end of a data path and a second transceiver on a second end of said data path within said circuit.

6. The invention of claim 5 wherein said system includes software for performing automatic Markov call testing on all digital signal paths throughcell site modem chips in a base station in said telecommunications circuit and storing the results of said automatic Markov call testing via said second means.

7. The invention of claim 1 wherein said third means includes software running on said computer, said software including means for determining if antennas at a base station are adequately balanced, and wherein said fourth means includes a computer, and a computer monitor.

8. The invention of claim 1 wherein said fourth means includes means for indicating receive antenna balancing.

\* \* \* \* \*